United States Patent [19]

Jordan

[11] 4,340,471

[45] Jul. 20, 1982

[54] SYSTEM AND APPARATUS FOR THE CONTINUOUS DESTRUCTION AND REMOVAL OF POLYCHLORINATED BIPHENYLS FROM FLUIDS

[75] Inventor: Otis D. Jordan, North Canton, Ohio

[73] Assignee: Sun-Ohio Inc., Canton, Ohio

[21] Appl. No.: 199,261

[22] Filed: Oct. 21, 1980

Related U.S. Application Data

[63] Continuation-in-part of Ser. No. 171,388, Jul. 23, 1980, abandoned.

[51] Int. Cl.[3] ............................................ B01D 19/00

[52] U.S. Cl. .................................... 210/101; 210/167; 210/177; 210/180; 210/206; 210/218

[58] Field of Search ............... 210/750, 757, 758, 765, 210/766, 793, 101, 167, 168, 177, 178, 180, 206, 218, 219, 274, 275, 290

[56] References Cited

U.S. PATENT DOCUMENTS

| | | | |
|---|---|---|---|
| 674,153 | 5/1901 | Bachman | 210/101 |
| 2,051,126 | 8/1936 | Baxter | 210/290 |
| 2,164,019 | 6/1939 | Perry | 210/101 |
| 2,249,681 | 7/1941 | Briggs | 210/168 |
| 2,775,555 | 12/1956 | Clarkson | 210/101 |
| 2,789,696 | 4/1957 | Jaknig | 210/274 |
| 2,870,088 | 1/1959 | Bergstrom | 210/274 |
| 2,897,150 | 7/1959 | Bencowitz | 210/758 |
| 2,994,432 | 8/1961 | Schluten | 210/101 |
| 3,704,006 | 11/1972 | Grant | 210/758 |
| 3,844,948 | 10/1974 | Burke | 210/177 |
| 3,944,383 | 3/1976 | Davis | 210/765 |
| 3,954,611 | 5/1976 | Reedy | 210/241 |
| 3,998,714 | 12/1976 | Armstron | 210/758 |
| 4,174,280 | 11/1979 | Pradt | 210/766 |
| 4,256,578 | 3/1981 | Kozar | 210/765 |

FOREIGN PATENT DOCUMENTS

| | | | |
|---|---|---|---|
| 1917357 | 5/1970 | Fed. Rep. of Germany | 208/182 |
| 47-125196 | 6/1972 | Japan . | |

OTHER PUBLICATIONS

Betz Handbook of Industrial Water Conditioning 1976, Trevose, Pa., 85.

The Condensed Chemical Dictionary, 8th Edition 1966, p. 124.

"A Complete Dechlorination of Polychlorinated Biphenyl by Sodium Naphthalene," *Chemistry and Industry*, Nov. 4, 1978 by Akira Oku, Kenjiro Yasufuku and Hideto Kataoka.

"Detoxifying PCB-Contaminated Transformer and Heat-Transfer Fluids," *Plant Engineering*, Aug. 21, 1980, pp. 133 & 134 by D. K. Parker and W. L. Cox.

"Goodyear Develops PCB Removal Method," Sep. 1, 1980, C & EN, p. 9.

*Primary Examiner*—Ernest G. Therkorn
*Attorney, Agent, or Firm*—Frease & Bishop

[57] ABSTRACT

A system and apparatus therefor for the removal and destruction of harmful toxic polychlorinated biphenyls (PCBs) from a fluid, such as electrical transformer oil. The contaminated fluid is pumped through heating equipment to raise its temperature to a predetermined level prior to it being fed into a mixing chamber. An injector mechanism feeds a predetermined quantity of a reagent, such as an elemental sodium dispersion, into the mixing chamber where a power-driven impeller thoroughly mixes the two fluids. This mixture is fed into a reaction zone, preferably consisting of a plurality of closely nested back-and-forth tubes of a predetermined length and cross-sectional area wherein a chemical reaction occurs between the PCB-fluid and reagent forming harmless by-products which are insoluable in the now decontaminated fluid. The solid by-products are removed in a separator, such as a filtering medium or centrifuge, and any gases and water vapor are removed in a deep vacuum degasser. The trapped, harmless by-products then can be disposed of in a conventional, safe manner and the decontaminated fluid can be returned to its point of origin for reuse.

26 Claims, 2 Drawing Figures

SYSTEM AND APPARATUS FOR THE CONTINUOUS DESTRUCTION AND REMOVAL OF POLYCHLORINATED BIPHENYLS FROM FLUIDS

CROSS REFERENCE TO RELATED APPLICATION

This application is a continuation-in-part of my co-pending application, Ser. No. 171,388, filed July 23, 1980, now abandoned.

BACKGROUND OF THE INVENTION

1. Field of the Invention

The invention relates to a system and to the apparatus thereof for the continuous removal and destruction of halogenated aromatic hydrocarbons from fluids. More particularly, the invention relates to a system and to the particular apparatus and arrangement thereof for the continuous removal and destruction of toxic polychlorinated biphenyls from oils which are used as the cooling fluids for transformers and for dielectric materials of electric capacitors.

2. Description of the Prior Art

Polychlorinated biphenyls (PCBs) are very stable compounds which are not destroyed by natural processes. Recently, their use has been banned for environmental reasons due to the possible danger to the environment and inhabitants. PCBs are not destroyed by natural processes and they are not biodegradable and will not disappear or decay to any extent by natural processes. Once they are formed, they can be destroyed only by special and expensive procedures.

Because of their terminal stability and nonflammable properties, PCBs have been used extensively as electrical insulating fluids and in dielectric materials such as in transformers and in capacitors. Although further use of PCBs for such purposes has been banned, huge quantities of these chemicals are present in the country today, especially in the electrical industry. Also, there is a vast amount of PCBs in storage awaiting a sure and inexpensive method of disposal. PCBs can be burned but only at a very high temperature and under rigidly controlled conditions. To date, incineration programs have not been entirely successful. PCBs also have been disposed of by burial, but this means of disposal presents the same risks that discourage the burial of any hazardous substance. Presently, the only known methods and means of disposal of PCBs are very costly and inefficient.

By the time PCBs were recognized as a hazard to health and the environment, they were widely disseminated in all compartments of the biosphere. Except in those instances where the concentration is great and the contaminated area is small, little can be done to correct the problem. Only time can do so, and the extraordinary stability of these chemicals suggests that it will be an exceedingly long time for destruction of these chemicals by natural processes. Due to the vast quantities of PCBs still in use today, eventual escape of these materials into the environment can be prevented only by an effective program and system for their destruction. It is estimated that oil-insulated transformers alone which are contaminated with more than 50 ppm of PCBs account for six hundred million gallons of contaminated oil. Add to this all the pure PCBs still in use for other purposes, and it is apparent that sooner or later a major portion of these PCBs will find their way into the environment unless a satisfactory means of disposal or destruction of PCBs is developed.

The incineration of the PCB-contaminated transformer oil used by some segments of the industry today results in the destruction of approximately twelve thousand pounds of transformer oil to get rid of approximately one pound of PCB. Likewise, the burial or incineration of PCBs or materials contaminated therewith also requires risky transportation to approved disposal sites, with the resulting dangers always present therewith.

A method for chemically removing PCBs and similar halogenated aromatic hydrocarbons from oils contaminated with such hazardous materials is disclosed and claimed in abandoned application, Ser. No. 99,341, filed Nov. 30, 1979. The present invention described below is a unique system and arrangement of equipment for carrying out this chemical method on a continuous large-scale effective commercial basis.

Presently there are two known processes for the continuous separation of PCBs from fluids which are contaminated with such materials, such as transformer oils. However, the apparatus and particular equipment for these systems are believed to be more complicated and expensive than that of the present invention and would be difficult to install in a self-contained mobile unit which can be transported to the site of the contaminated oil. Both of these known processes and the limited description of the system and equipment thereof are contained in the prior art publications listed in the Prior Art Statement of the present invention.

SUMMARY OF THE INVENTION

Objectives of the invention include providing a system for the continuous chemical destruction of halogenated aromatic hydrocarbons and particularly of polychlorinated biphenyls (PCBs) and for the cleansing of fluids containing the same, and in particular of those PCBs contained in transformer oils by a unique arrangement and interrelationship of various equipments by providing for the continuous controlled reaction between the PCBs and a reagent such as an elemental sodium dispersion; providing such a system which includes means for the separation of the products of reaction between the PCBs and reagent whereby such products are extracted on a continuous basis in a closed system which is effective and safe; providing such a system which includes means for the destruction of the PCBs after their separation from the contaminated oil and in which the cleansed oil can be returned directly into the transformer which heretofore contained the contaminated oil; providing such a system in which the apparatus and equipment therefor can be assembled on a portable unit such as a large trailer/tractor rig which eliminates transportation of the contaminated fluids to the cleansing site with the inherent risks thereof, in which this self-contained unit can operate from an external electrical power source available at the job site or from a self-generated unit provided on the mobile unit; providing such a system which uses a majority of standard equipment, apparatus and components, reducing the costly manufacture and development of specially designed components; providing such a system which will generate only those by-products from the chemical reaction therein which in themselves will not be objectionable; providing such a system for the treatment of electrical insulating fluids in a manner which will not destroy the non-PCB portion of the fluids and which will not destroy their useful insulating properties, so that the cleansed oil can be reused, and in which the system can destroy not only PCBs in electrical oils but will also eventually destroy neat PCB; providing such a system and apparatus for carrying out the chemical method for the destruction of PCBs and their removal from insulating oils, as set forth in abandoned application Ser. No. 99,341, filed Nov. 30, 1979; providing such a system which does not require a major capital investment and which is extremely inexpensive for operation requiring a relatively small amount of energy while saving the previously contaminated fluid for reuse, which is able to handle very low levels of contamination and which has a broad application in that it can be used for the decontamination of certain other fluids containing harmful halogenated aromatic hydrocarbons; providing such a system which combines various components and apparatus that assures that the contaminated fluid will be thoroughly co-mingled with a reagent under the proper conditions of quantity, temperature, forward motion, timed retention, pressure, vacuum, filtration and storage to bring about the desired reaction necessary to destroy the PCBs and to separate the undesirable products of the reaction, and make available for reuse the cleansed fluid; providing such a system and apparatus therefor which eliminates difficulties existing in the art, solves problems, satisfies needs and obtains new results.

These objectives and advantages are obtained by a system for the continuous destruction of polychlorinated biphenyls, the general nature of which may be stated as including a mixing zone; means for feeding a predetermined quantity of polychlorinated biphenyl into said mixing zone; means for feeding a predetermined quantity of an elemental sodium dispersion into said mixing zone; means for maintaining the polychlorinated biphenyl and sodium dispersion above a predetermined temperature; and separator means for separating the products of reaction between the polychlorinated biphenyl and sodium dispersion.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

Similar numerals refer to similar parts throughout the drawings.

DESCRIPTION OF THE PREFERRED EMBODIMENT

Figure 1:
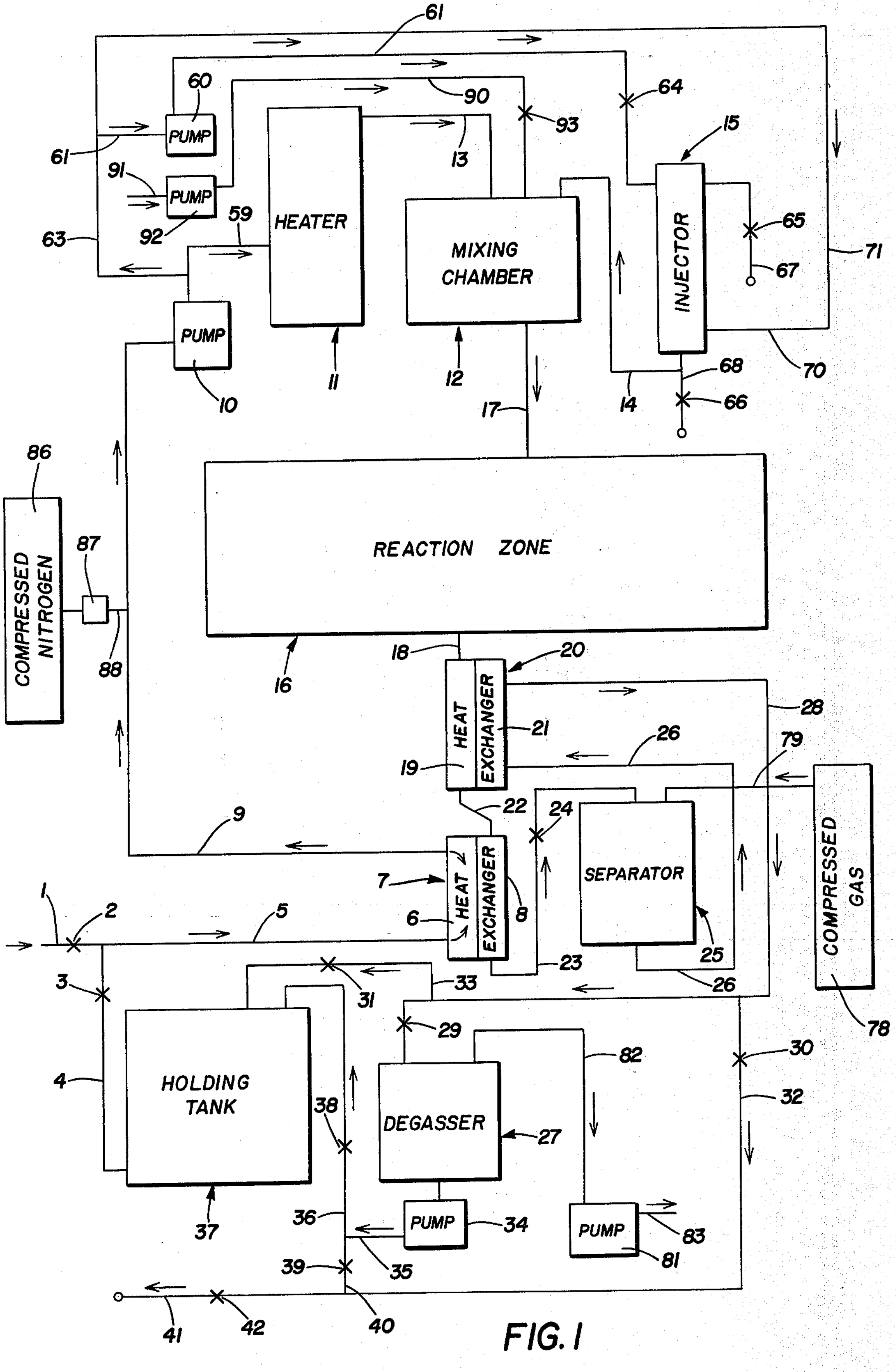
FIG. 1 is a block diagram of the improved system and apparatus therefor.
Figure 2:
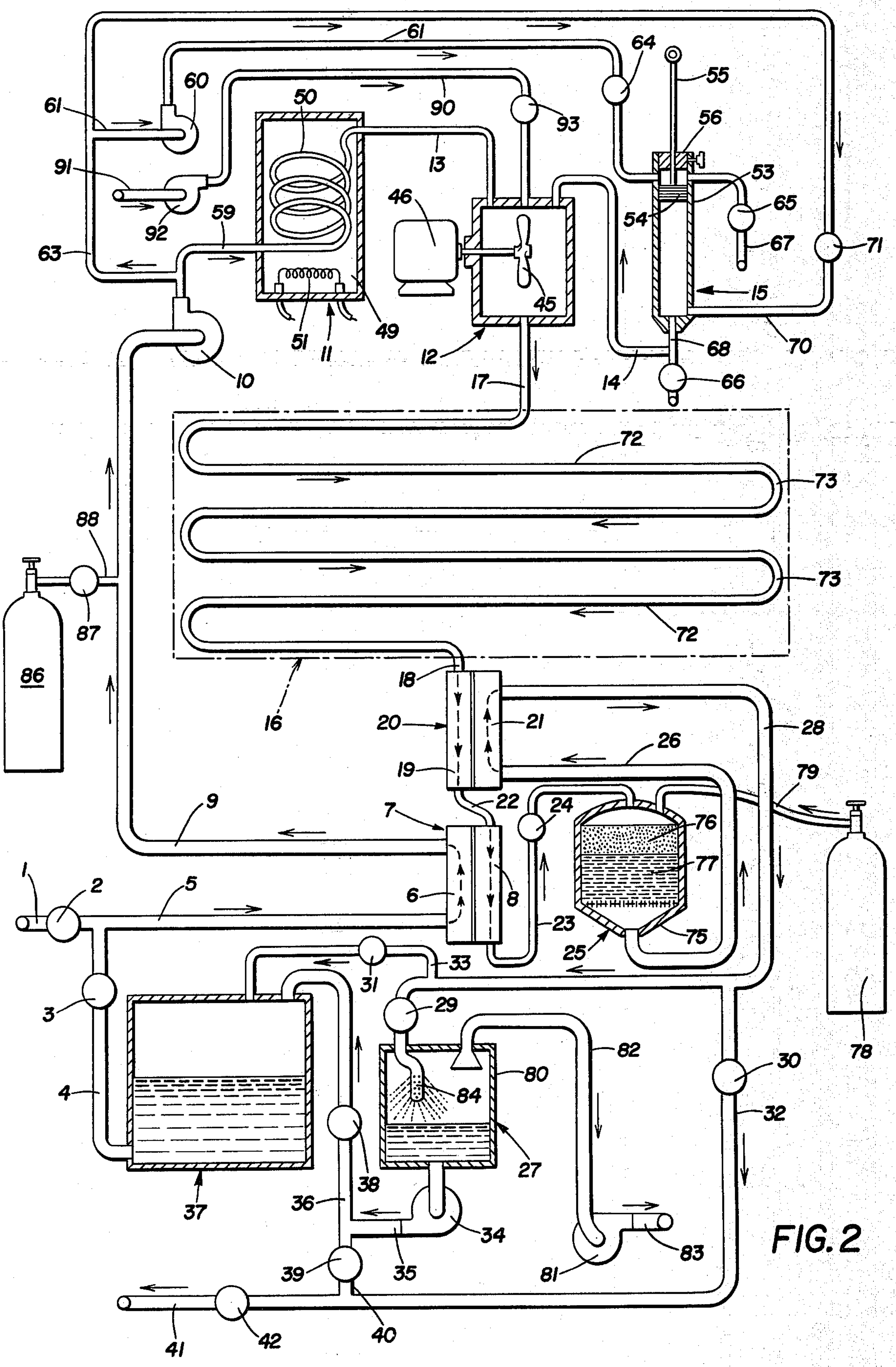
FIG. 2 is a generally diagrammatic, more detailed layout of the system and of the apparatus thereof that is shown in FIG. 1.

FIG. 1 is a block diagram of the improved system, the features of which are shown in greater detail in FIG. 2. Referring to FIG. 1, a fluid contaminated with the PCBs, such as transformer oil, enters the system through an incoming line 1. Line 1 can be connected directly to a power transformer or the like in which the contaminated fluid is contained. When the contaminated fluid is brought into the system from an outside source, a valve 2 in line 1 is open and a valve 3 in a branch line 4 is closed. The contaminated fluid flows from line 1 into line 5 and continues through a section 6 of a heat exchanger indicated generally at 7. The fluid flowing through section 6 of the heat exchanger will extract heat from an adjacent section 8 through which heated fluid is flowing, as described in detail below. The partially heated fluid will leave heat exchanger section 6 through line 9 by the action of a pump 10.

The fluid then enters a heater 11 where the temperature of the contaminated fluid is raised to a predetermined level for achieving the most efficient reaction with the particular reagent that is being used in the system. Transformer oil preferably is heated to within the range of 120° C. to 130° C. From this point of the system forward, the various lines conveying the fluid are heavily insulated to conserve the heat and to maintain the conveyed fluid at the optimum temperature until the desired chemical reaction is completed.

After leaving heater 11, the heated fluid enters a mixing chamber, indicated generally at 12, through a connecting line 13. While in mixing chamber 12, the heated fluid encounters the reagent, which for PCB-contaminated transformer oil preferably is a dispersion of elemental sodium. In accordance with one of the features of the invention, the elemental sodium or other reagent is injected into mixing chamber 12 through line 14 at a predetermined rate by an injector mechanism, indicated generally at 15, the details of which are described more fully below.

After receiving and being mixed with the predetermined amount of sodium in mixing chamber 12, the oil-sodium mixture flows into a reaction zone, indicated generally at 16, through line 17. At the preferred temperature range of 120° C. to 130° C., the sodium dispersion will become liquid and co-mingle freely with the contaminated fluid or PCB-contaminated transformer oil. The details of reaction zone 16 also are described in greater detail below.

Once the oil-sodium mixture completes its journey through reaction zone 16, the reaction between the sodium and PCB is largely complete and the PCBs are broken down into the by-product of the chemical reaction which takes place in reaction zone 16. It is then desirable that the temperature of the decontaminated fluid leaving reaction zone 16 be reduced to below the melting point of sodium (97.83° C.) so that any excess sodium may solidify from the liquid state for removal by filtration or centrifuging. Lowering of the temperature of the products of reaction also accelerates the acervation of the by-product polymers, making them more susceptible to separation from the fluid by filtering or centrifuging.

To achieve the desired drop in temperature, the decontaminated fluid containing the by-products of reaction leaves reaction zone 16 through a line 18 and passes through a section 19 of a second heat exchanger, indicated generally at 20, where the fluid encounters and gives up heat to fluid further along in the system which is passing through an adjacent heat exchanger section 21. To achieve an even further drop in temperature, this fluid leaves heat exchanger section 19 through a line 22 and passes through section 8 of heat exchanger 7 where it encounters and gives up heat to the cooler contaminated fluid just entering the system through lines 1 and 5, as described above.

The fluid mixture now is sufficiently cooled to permit solidification of any excess sodium and to promote acervation of the by-product polymers. The cooled fluid leaves heat exchanger section 8 through line 23 and passes through an open valve 24 and into a separator, indicated generally at 25. Any suspended excess reagent and by-product solids are removed in separator 25 with the decontaminated fluid leaving separator 25 through line 26. This fluid then passes through section 21 of heat exchanger 20 to pick up additional heat from the previously heated fluid passing through heat exchanger section 19 after leaving reaction zone 16 since higher temperature promotes degassing. The heated decontaminated fluid then enters a degasser chamber, indicated generally at 27, through line 28 and an open valve 29. Valves 30 and 31 in branch lines 32 and 33 are in closed position so that the fluid after leaving heat exchanger section 21 will enter degasser chamber 27.

The decontaminated and cleansed fluid is removed from degasser chamber 27 by a pump 34 through line 35. This fluid is placed either in a holding tank 37 through line 36 or else is returned to the transformer or other equipment from which it came through lines 40 and 41 depending upon the position of valves 38, 39 and 42 located in lines 36, 40 and 41, respectively.

The above description sets forth in general terms the particular system and apparatus of the invention. FIG. 2 shows in detail this unique system and the particular apparatus used therein. Pump 10 is a usual positive displacement adjustable flow pump which is adjustable to regulate the rate of flow of the PCB-contaminated oil or other fluids entering the system through line 1 and flowing through lines 5 and 9 through heater 11 and into mixing chamber 12.

Mixing chamber 12 preferably contains an agitator or impeller 45 driven by a motor 46 in order to provide a thorough and complete mixing of the contaminated oil with the reagent entering mixing chamber 12 through line 14.

Heat exchangers 7 and 20 preferably are the fluid-to-fluid multiple tube and jacket type of construction, one example of which is produced under the designation type 500 by Basco Division of American Precision Industries.

Heater 11 preferably consists of an enclosed tank or chamber 49 containing a plurality of coils 50 through which the contaminated oil passes, enabling the oil to be heated to the desired temperature by a heating element 51 which also is located in tank 49. One type of heater found satisfactory is a thermal fluid heater produced by Fulton Thermal Corp. of Pulaski, N.Y., under its designation of The Fulton Thermopac, Model No. FT-0080-0.

In accordance with one of the features of the invention, injector 15 provides an extremely satisfactory means for injecting the predetermined amount of reagent into mixing chamber 12. Injector 15 consists of a hollow cylinder 53 having a reciprocating piston 54 movably mounted therein. Piston 54 includes a piston rod 55 which is in a sliding sealing engagement with rod gland 56. Cylinder 53 is filled with the sodium dispersion which is the preferred reagent for decontaminating PCB-contaminated oil through the open top thereof after removal of rod gland 56 and of piston 54. This sodium dispersion which is in a creamy liquid state is injected into chamber 12 through line 14 upon the downward movement of piston 54 in cylinder 53. The discharge rate of this sodium dispersion from injector 15 is accurately controlled and determined by a small quantity of the oil being processed.

A quantity of the oil which is discharged by pump 10 and flows into heater 11 through line 59 is injected into the upper part of cylinder 53 above piston 54 by a controllable rate positive displacement pump 60 which is placed in a line 61 which extends from cylinder 52 and is connected to line 59 by branch line 63. Pump 60 is a usual controllable positive displacement pump of the type sold by Hills-McCanna of Carpentersville, Ill., under its designation Master Line Proportioning Pump, Model No. MC-21F.

Depending upon the amount of sodium dispersion to be injected into mixing chamber 12 and the rate of flow of the contaminated oil determined by pump 10, pump 60 is adjusted so that a predetermined quantity of oil enters the top of cylinder 53 at a predetermined rate. The downward movement of piston 54 will inject the desired quantity of sodium dispersion into mixing chamber 12 in relationship to the flow rate of contaminated oil discharged therein by pump 10. The amount of sodium dispersion injected into mixing chamber 12 is determined by the amount of PCBs or other contaminated halogenated aromatic hydrocarbons contained in the oil or other fluids which was determined by prior tests on the oil or fluids.

Valves 64, 65 and 66 located in branch line 61 and in discharge lines 67 and 68, respectively, enable the oil which accumulates in cylinder 53 above piston 54 to be removed after all of the sodium dispersion has been ejected from the cylinder. Valve 64 is closed and valves 65 and 66 are opened, whereupon manual upward movement of piston 54 will allow the accumulated oil to flow through line 67 into a closed container (not shown) for subsequent disposal, with the vacuum created in cylinder 53 being relieved through line 68 and open valve 66.

A line 70 extends from the bottom of cylinder 53 and is connected to lines 61 and 63 at their junction point. Opening of a valve 71 in line 70 and closing of valve 64 in line 61 permits a flow of oil directly from the outlet side of pump 10 through lines 63 and 70 and across the bottom of cylinder 53 and into mixing chamber 12 for the purpose of cleansing the cylinder of any sodium dispersion which may remain in the bottom of the cylinder after piston 54 has completed its downward injection stroke.

Although the above-described injector 15 is the preferred construction, it is also possible to inject the sodium dispersion at a controlled rate into mixing chamber 12 by using a pump (not shown) which is lined and fitted with a material such as boron nitride to which the sodium will not cling in areas of close clearances. Also, the sodium dispersion can be replaced by a potassium dispersion without affecting the invention.

Another important feature of the invention is the construction and configuration of reaction zone 16. In the particular embodiment shown diagrammatically in FIG. 2, reaction zone 16 consists of a plurality of closely nested tube sections 72 connected by reverse bends 73 to provide a continuous looped flow path for the contaminated oil-sodium mixture after it leaves mixing chamber 12 through line 17. The overall tube length and cross-sectional configuration thereof which determines the total volume of the tubular arrangement forming reaction zone 16 when related to the fluid mixture flow rate entering therein determines the desired holding time of the mixture within the reaction zone.

By way of illustration, reaction zone 16 consists of a two-inch internal diameter tube having an effective total length of nine hundred thirty-seven feet including the reverse bends, which holds approximately one hundred fifty-three gallons of oil-sodium mixture. With a nominal flow rate of ten gallons per minute, this configuration will result in an effective reaction holding time of fifteen minutes within zone 16. For the purposes of compactness and mobility, and to achieve a turbulence in the flow of fluid mixture through reaction zone 16, this closely nested forward-and-back tube section arrangement is found to be highly effective. Furthermore, it has been found that when the cross-sectional area of the tubes or area of flow is small and the lineal distance is large, the back mixing of reacted fluid with less reacted fluid, all of which is moving through the nested tubes, is minimized. In particular, it has been found that a reaction vessel (tubes) having a linear length in the direction of flow greater than the square root of the cross-sectional flow produces extremely efficient and satisfactory results.

Another advantage of this looped tube arrangement is the flexibility of construction. For example, when the system and apparatus of the invention are incorporated into a mobile unit, the tubes can be attached to the inside walls of the trailer or concealed behind partition walls spaced a short distance outwardly from the trailer walls.

Separator 25 is shown in FIG. 2 as a filtration unit consisting of a closed vessel 75 having two separate filtering layers 76 and 77 arranged in series therein. Filtering section 76 preferably contains an uncalcined Fuller's earth filtering medium, and section 77 contains a calcined Fuller's earth filtering medium. The uncalcined Fuller's earth preferably contains a small amount of water which will combine with any unspent sodium in the reacted oil-sodium mixture entering separator 25 so as to form sodium hydroxide (NA OH), which together with any solids suspended in the fluid mixture will be trapped in both filtering sections.

Since the chemical reaction between the PCBs contained in the transformer oil and the sodium dispersion is not in and of itself the primary object of this invention but is set forth and claimed in abandoned application Ser. No. 99,341, filed Nov. 30, 1979, a brief description is set forth below for a better understanding of the primary object of this invention; that is, to provide a unique system and apparatus therefor for carrying out such a chemical reaction, as well as other procedures for the destruction and removal of other halogenated aromatic hydrocarbons from fluids.

PCBs are biphenyls wherein one or more of the hydrogen atoms have been replaced with chlorine atoms. The resulting compounds have been found to be hazardous to the health and harmful to the environment and it is desirable that they be destroyed wherever they may be, either in pure form or present as contaminants in electrical insulating fluids, mineral-based transformer oils and the like, which are the most notable examples and which are set forth in detail in this disclosure. Intimate contact between elemental sodium and a fluid containing PCBs, when achieved at a proper and controlled temperature, results in a reaction between the sodium and chlorine, wherein the chlorine combines with the sodium to form sodium chloride, and the biphenyl forms into various polymers that are not soluble in the fluid (transformer oil) from which the PCBs are being removed. Both the chlorides and polymers which are the by-products of the reaction which takes place in reaction zone 16 may be filtered from the transformer oil or removed by other known means such as centrifuging.

Once the transformer oil-sodium fluid mixture formed in mixing chamber 12 completes its prolonged journey through tube sections 72 of reaction zone 16, the reaction between the sodium and PCB is largely completed. It is desirable that the temperature of the reacted mixture upon leaving reaction zone 16 be reduced below the melting point of sodium so that any excess sodium may solidify from the fluid or molten state, enabling it to be easily removed in separator 25. Lowering of the temperature of the reacted fluid also accelerates the acervation of the by-product polymers making them more susceptible to separation from the fluid by filtration or centrifuging. This is the reason for passing the reacted fluid through heat exchangers 20 and 7 prior to injecting this fluid into separator 25.

The fluid leaving reaction zone 16 in line 18 has been decontaminated and consists of a mixture of the transformer oil and by-products sodium chloride and various polymers. These by-products then are removed in separator 25 which is a conventional means of removing impurities such as these. When vessel 75 is filled with Fuller's earth as the filtering medium, it results in the Fuller's earth trapping and containing the by-products therein, which are not hazardous or harmful to health or the environment and which can be disposed of in conventional waste dumping manner.

From time to time, it becomes necessary to renew the Fuller's earth or other filtering material in filtration vessel 75. Upon such occasions, the pumping process is stopped and valve 24 is closed, and compressed gas from a cylinder 78 is admitted to the top of filtration vessel 75 through line 79 to evacuate any fluid remaining in filtering layers 76 and 77 by forcing it through the layers and into line 26 and onward through the system. Once evacuated of fluid, vessel 75 may be opened and filtering layers 76 and 77 replaced. The preferred gas in cylinder 78 is carbon dioxide which serves the necessary and useful purpose of evacuating fluid from the filtering medium and also reacts with any sodium hydroxide present in vessel 75 to produce sodium carbonate ($NA_2CO_3$), which is less corrosive and which may be handled and disposed of with less risk than can sodium hydroxide.

After passing through filtration vessel 75 where the suspended solids are removed, the further cleansed transformer oil is fed into vacuum degasser 27 through lines 26 and 28. Degasser 27 preferably consists of a closed vessel 80 with a vacuum pump 81 operatively connected to the interior thereof through a line 82 for subjecting the interior of degasser vessel 80 to a deep vacuum. This vacuum will draw off any gases through line 82 which may have been entrained in or dissolved in the fluid leaving filtration vessel 75 and entering degasser vessel 80. Most gases, including water vapor, which would be withdrawn from degasser vessel 80 by pump 81 are harmless and can be discharged directly into the surrounding atmosphere through pump discharge line 83.

The oil upon entering degasser vessel 80 is sprayed by a nozzle 84 to assist in releasing any gases therefrom. This decontaminated and cleansed transformer oil collects in the bottom of vessel 80 and is drawn off by pump 34 through line 35 for storage in holding tank 37 or returned through line 41 to the transformer or other electrical equipment from which the original PCB-contaminated oil was obtained.

Separator 25 and degasser 27, in addition to removing the by-products of the chemical reaction in which the PCBs are removed from the contaminated oil and destroyed, also remove other impurities commonly found in transformer oil and which are removed by such filtering and degassing procedures. Thus, in addition to decontaminating the transformer oil, it is cleansed prior to its returning to the transformer for reuse. The beneficial effects of this process may be diminished in the presence of oxygen and in the presence of various inhibitors commonly added to electrical insulating fluids, such as di-tertary butyl para cresol and ditertary butyl phenol. In these circumstances, the process may be enhanced by simply injecting a neutral gas, such as nitrogen, into the fluid stream as it enters the process.

Injection of nitrogen into the system can be accomplished easily, such as by a cylinder 86 containing compressed nitrogen having a regulated flow control valve 87 connected thereto. The nitrogen can be introduced into the system at various locations prior to the fluid entering mixing chamber 12. Nitrogen cylinder 86 is shown in FIGS. 1 and 2 being connected to line 9 by a line 88 in which flow control valve 87 is located. Although nitrogen is the preferred gas to inject into the system to diminish the presence of oxygen, another inert gas would be satisfactory. Likewise, the nitrogen can be introduced into the system at other locations than that shown in the drawings.

In the above description, the system and apparatus of the invention have been described and illustrated in relationship to the removal and destruction of PCBs contained in a fluid such as transformer oil. However, in accordance with another feature of the invention, the improved system and apparatus can be used for the destruction of pure PCBs or similar harmful halogenated aromatic hydrocarbons. A quantity of uncontaminated fluid such as transformer oil, mineral oil, etc. is contained in holding tank 37. Valve 2 in the incoming line 1 is closed and uncontaminated oil is withdrawn from holding tank 37 through lines 4, 5 and 9 by means of pump 10. After this oil is heated by passing it through heater 11, it is injected into mixing chamber 12 where it is mixed with pure PCB entering chamber 12 through an incoming line 90. The pure PCB is drawn from a sealed container (not shown), where it has been stored for distribution, through line 91 by a positive displacement pump 92. A valve 93 located in line 90 is placed in open position.

The contaminated fluid now in chamber 12 is mixed with the reagent fed therein from injector 15 and mixed therewith in the predetermined quantities. The contaminated fluid then leaves mixing chamber 12 through line 17 and passes through the remaining portions of the system as described above, whereupon the PCBs are destroyed and the resultant by-products are captured and separated from the fluid which was contaminated by the injected PCB. The cleansed fluid then is returned from degasser 27 by pump 34 back into holding tank 37 for subsequent use for destroying additional PCBs injected into the system through inlet line 91.

Although all descriptions and illustrations specified herein are in reference to the destruction of polychlorinated biphenyls, the unique system and apparatus described herein are equally effective for the destruction of polyfluoridated biphenyls, polybromated biphenyls and polyiodated biphenyls. It also is equally suited for the destruction of chlorinated, fluoridated, bromated and iodated benzenes.

Conversely, the invention describes a system and apparatus that are equally useful in the destruction of polychlorinated biphenyls, polyfluoridated biphenyls, polyiodated biphenyls, chlorinated benzene, fluoridated benzene, bromated benzene and iodated benzene by substituting for the reagent sodium and alternate reagent, specifically potassium or lithium.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved system and apparatus therefor which are illustrated and described herein are by way of example, and the scope of the present invention need not be limited to the exact details thereof.

Having now described the features, discoveries and principles of the invention, the manner in which the system and apparatus for the continuous destruction and removal of halogenated aromatic hydrocarbons from fluids is arranged and constructed, and the advantageous new and useful results obtained thereby; the new and useful structures, devices, elements, arrangements, parts, and combinations are set forth in the appended claims.

I claim:

1. A system for the continuous destruction of polychlorinated biphenyl present in a fluid including:

(a) a mixing chamber;

(b) agitating means in the mixing chamber for thoroughly agitating and mixing the contents of said chamber;

(c) pump means for feeding a predetermined quantity of the fluid containing polychlorinated biphenyl into the mixing chamber;

(d) heating means for raising the temperature of the fluid to a predetermined temperature;

(e) injector means for feeding a predetermined quantity of a reagent such as an elemental sodium or potassium dispersion into the mixing chamber, said injector means operatively communicating with the pump means whereby the amount of fluid being fed by said pump means into the mixing chamber controls the quantity of reagent being fed into the mixing chamber by the injector means;

(f) reaction chamber means operatively connected to the mixing chamber for receiving the fluid containing the polychlorinated biphenyl and reagent from said mixing chamber, said reaction chamber having an elongated configuration with a linear length in the direction of flow greater than the square root of the cross-sectional area of the chamber across the direction of flow;

(g) separator means for separating the products of reaction between the polychlorinated biphenyl and reagent from the fluid leaving the reaction chamber means; and (h) degassing means for removing certain gases contained in the fluid and products of reaction leaving the separator means.

2. The system defined in claim 1 in which the agitating means in the mixing chamber includes a motor-driven impeller.

3. The system defined in claim 1 in which the injector means includes a cylinder adapted to contain a quantity of the reagent and a piston reciprocally movable in the cylinder; and in which piston actuation means operatively connects the pump means to the injector means for moving the piston within the cylinder to force the reagent from the cylinder at a predetermined rate in relationship to the flow of fluid into the mixing chamber by the pump means.

4. The system defined in claim 3 in which the piston actuation means includes a second fluid pump and fluid inlet and outlet lines connected to said second pump; in which the inlet line communicates with the mixing chamber fluid feed pump means and the outlet line communicates with the cylinder for pumping a predetermined quantity of the fluid from the fluid containing the polychlorinated biphenyl before it enters the mixing chamber into the cylinder for moving the piston to discharge a predetermined quantity of the reagent from the cylinder into the mixing chamber.

5. The system defined in claim 1 in which the injector means is a boron nitride lined and fitted pump.

6. The system defined in claim 1 in which the heating means includes a thermal fluid heater and a heat exchanger for raising the temperature of the fluid containing the polychlorinated biphenyl before said fluid enters the mixing chamber.

7. The system defined in claim 6 in which the heating medium of the heat exchanger is the fluid and products of reaction leaving the reaction chamber means before entering the separator means.

8. The system defined in claim 1 including means operatively connected between the reaction chamber means and the separator means for lowering the temperature of the fluid and products of reaction.

9. The system defined in claim 8 in which the temperature lowering means is a heat exchanger; and in which the cooling medium of said heat exchanger is the fluid containing the polychlorinated biphenyl prior to said fluid entering the mixing chamber.

10. The system defined in claim 1 including means operatively connected between the separator means and the degassing means for raising the temperature of the fluid entering the degassing means.

11. The system defined in claim 10 in which the temperature raising means is a heat exchanger; and in which the heating medium of said heat exchanger is the fluid and products of reaction leaving the reaction chamber means prior to entering the separator means.

12. The system defined in claim 1 in which the fluid containing the polychlorinated biphenyl is hydrocarbon oil.

13. The system defined in claim 1 including means for periodically regenerating the separator means.

14. The system defined in claim 1 in which the reaction chamber means is formed by a plurality of closely nested forward-and-back tube sections connected by reverse bends.

15. The system defined in claim 1 in which the separator means is a filtering medium.

16. The system defined in claim 15 in which the filtering medium of the separator means is Fuller's earth.

17. The system defined in claim 15 in which the separator means includes two separate sections, each containing a filtering medium; and in which said sections are connected in series.

18. The system defined in claim 17 in which one of the separator means sections contains uncalcined Fuller's earth and the other of said sections contains a calcined Fuller's earth.

19. The system defined in claim 15 in which a supply of compressed gas is adapted to be operatively connected to the separator means for purging the filtering medium of fluid prior to replacing said filtering medium.

20. The system defined in claim 19 in which the compressed gas is carbon dioxide.

21. The system defined in claim 1 in which the separator means is a centrifuge.

22. The system defined in claim 1 in which the degassing means includes a degassing chamber and pump means; and in which said pump means includes a first pump for drawing off said certain gases contained in the products of reaction and a second pump for drawing off the fluids previously containing the polychlorinated biphenyl.

23. The system defined in claim 1 in which holding tank means communicates with the separator means for receiving the fluid from the separator means after the products of reaction are removed therefrom.

24. The system defined in claim 1 including means for injecting a predetermined quantity of an inert gas into the fluid containing the polychlorinated biphenyl prior to said fluid entering the mixing chamber.

25. The system defined in claim 24 in which the inert gas is nitrogen.

26. The system defined in claim 24 in which the injecting means is a cylinder of the compressed inert gas and a feed control valve.

* * * * *